United States Patent
Wang (10) Patent No.: US 8,344,910 B2
(45) Date of Patent: Jan. 1, 2013

(54) AIRCRAFT CABIN NOISE EXPOSURE ANALYSIS

(75) Inventor: Zhennong Wang, Renton, WA (US)

(73) Assignee: The Boeing Company, Chicago, IL (US)

(*) Notice: Subject to any disclaimer, the term of this patent is extended or adjusted under 35 U.S.C. 154(b) by 787 days.

(21) Appl. No.: 12/543,402

(22) Filed: Aug. 18, 2009

(65) Prior Publication Data

US 2011/0043382 A1 Feb. 24, 2011

(51) Int. Cl.
*G08B 21/00* (2006.01)
(52) U.S. Cl. .......................... 340/945; 701/3; 342/450
(58) Field of Classification Search .............. 340/945, 340/500, 538.12; 701/117, 120, 3; 342/450, 342/457
See application file for complete search history.

(56) References Cited

U.S. PATENT DOCUMENTS

| | | | |
|---|---|---|---|
| 6,198,991 B1 | 3/2001 | Yamakawa et al. | |
| 7,383,104 B2* | 6/2008 | Ishii et al. | 701/3 |
| 7,530,266 B2 | 5/2009 | Tillotson et al. | |
| 7,576,695 B2* | 8/2009 | Smith et al. | 342/465 |
| 7,889,133 B2* | 2/2011 | Smith et al. | 342/450 |
| 2006/0191326 A1* | 8/2006 | Smith et al. | 73/73 |
| 2007/0214893 A1 | 9/2007 | Killon | |
| 2008/0148839 A1 | 6/2008 | Tillotson et al. | |
| 2008/0187163 A1 | 8/2008 | Goldstein et al. | |
| 2009/0265049 A1* | 10/2009 | Wise et al. | 701/3 |
| 2011/0046818 A1* | 2/2011 | Herkes et al. | 701/3 |

* cited by examiner

*Primary Examiner* — George Bugg
*Assistant Examiner* — Edny Labbees
(74) *Attorney, Agent, or Firm* — Caven & Aghevli LLC (57) ABSTRACT

Systems and methods for aircraft cabin noise analysis are disclosed. In one embodiment, a method includes receiving a first request for an aircraft cabin noise analysis, wherein the request comprises a plurality of flight parameters associated with a first flight mission, retrieving, from a computer readable memory, a plurality of noise parameters associated with the plurality of flight parameters for the first flight mission, determining a total noise exposure parameter associated with the first flight mission, generating an output comprising the total noise exposure on a user interface, and generating a warning on a user interface when the total noise exposure exceeds a threshold. In some embodiments, the monitored system may be implemented in a computing system or as logic instructions recorded on a computer readable medium.

18 Claims, 12 Drawing Sheets

AIRCRAFT CABIN NOISE EXPOSURE ANALYSIS

BACKGROUND

Aircraft pilots and crew are exposed to noise arising from aircraft operation. Occupational noise exposure is receiving increased attention from various regulatory bodies. Quantifying noise exposure in an aircraft is complex due to, e.g., variation of noise sources through the flight, the flight profile, various work schedule effects, different crew positions, etc. Accordingly, systems and methods to gauge noise exposure in an aircraft environment may find utility.

SUMMARY

Embodiments of systems and methods in accordance with the present disclosure may provide improved aircraft cabin noise exposure analysis. More specifically, embodiments described herein may utilize at least one of simulation data and historical data to develop noise exposure profiles for various locations within an aircraft and under various operating conditions. Such noise exposure profiles may be stored in a computer readable memory, e.g., a database. Users may then access the database through a suitable user interface to assess noise exposure profiles for pilots and various categories of aircraft crew. For example, flight crew schedulers and regulatory compliance personnel may access the system to assess noise exposure levels for pilots and flight crew. Flight schedules and/or flight profiles may be changed to manage noise exposure.

In one embodiment, a computer based method to evaluate aircraft cabin noise comprises receiving a first request for an aircraft cabin noise analysis, wherein the request comprises a plurality of flight parameters associated with a first flight mission, retrieving, from a computer readable memory, a plurality of noise parameters associated with the plurality of flight parameters for the first flight mission, determining a total noise exposure parameter associated with the first flight mission, generating an output comprising the total noise exposure on a user interface, and generating a warning on a user interface when the total noise exposure exceeds a threshold.

In another embodiment, a computer based system to evaluate aircraft cabin noise comprises a processor and a computer readable memory module comprising logic instructions which, when executed by the processor, configure the processor to receive a first request for an aircraft cabin noise analysis, wherein the request comprises a plurality of flight parameters associated with a first flight mission, retrieve, from a computer readable memory, a plurality of noise parameters associated with the plurality of flight parameters for the first flight mission, determine a total noise exposure parameter associated with the first flight mission, generate an output comprising the total noise exposure on a user interface, and generate a warning on a user interface when the total noise exposure exceeds a threshold.

In a further embodiment, a computer program product comprises logic instructions stored on a computer readable medium which, when executed, configure a processor to evaluate aircraft cabin noise by performing operations, comprising receiving a first request for an aircraft cabin noise analysis, wherein the request comprises a plurality of flight parameters associated with a first flight mission, retrieving, from a computer readable memory, a plurality of noise parameters associated with the plurality of flight parameters for the first flight mission, determining a total noise exposure parameter associated with the first flight mission, generating an output comprising the total noise exposure on a user interface; and generating a warning on a user interface when the total noise exposure exceeds a threshold.

Further areas of applicability will become apparent from the description provided herein. It should be understood that the description and specific examples are intended for purposes of illustration only and are not intended to limit the scope of the present disclosure

BRIEF DESCRIPTION OF THE DRAWINGS

Embodiments of methods and systems in accordance with the teachings of the present disclosure are described in detail below with reference to the following drawings.

FIGS. 6-11 are screenshots of one embodiment of a system for aircraft noise exposure analysis according to embodiments.

DETAILED DESCRIPTION

Systems and methods for aircraft cabin noise exposure analysis are described herein. Specific details of certain embodiments are set forth in the following description and in FIGS. 1-12 to provide a thorough understanding of such embodiments. One skilled in the art will understand, however, that alternate embodiments may be practiced without several of the details described in the following description.

In some embodiments the system described herein may be used to assess noise exposure for pilots and various flight crew members. For example, in some embodiments scheduling personnel may use the system to assist in creating flight schedules and/or by compliance personnel in determining compliance with noise exposure regulations. Flight mission data and personnel data may be entered by a user interface. Noise exposure data for the personnel and flight mission are generated and presented on a display. In addition, a warning may be presented if noise exposure limits for the personnel exceed a threshold. Flight mission parameters may be revised and/or personnel changes may be implemented in order to bring noise exposure parameters within acceptable limits. Reports may be generated on a suitable user interface.

As used herein, the phrase "flight mission" refers to a defined flight schedule, while the phrase "flight leg" or "leg" refers to a component of the flight schedule bound by one takeoff and one landing. Thus, a flight mission may include one or more legs. Similarly, a flight leg may comprise a plurality of flight segments.

Figure 1:
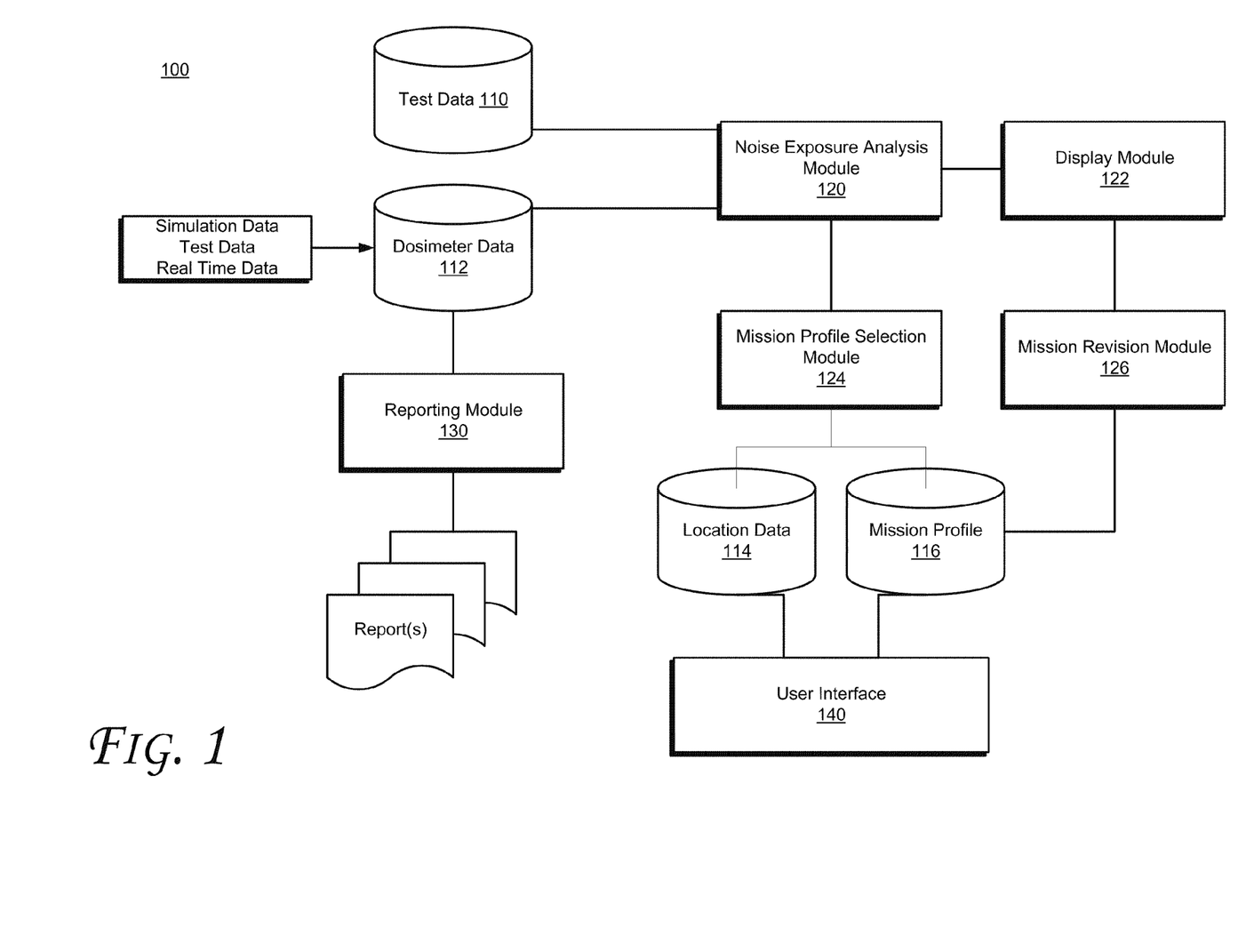
FIG. 1 is a schematic illustration of a system for aircraft noise exposure analysis according to embodiments.

FIG. 1 is a schematic illustration of a system 100 for aircraft noise exposure analysis according to embodiments. Referring to FIG. 1, in one embodiment the system 100 comprises multiple data stores for test data 110, dosimeter data 112, location data 114, and mission profile data 116. In some embodiments, the system 100 further comprises a noise exposure analysis module 120, a display module 122, a mission profile selection module 124, a mission revision module 126, a reporting module 130 and a user interface 140.

In some embodiments the various data stores 110, 112, 114, 116 may be implemented as databases or as flat files stored on a computer readable medium. Test data 110 may comprise noise exposure data for various locations and in various operation conditions on an aircraft. Test data 110 may be collected during one or more test flights of an aircraft. Dosimeter data 112 may comprise noise dosage data for various locations and operating conditions on a specific aircraft. Location data 114 may comprise data which correlates crew position indicators with locations on an aircraft. For example, a pilot indicator is correlated with the pilot location on the aircraft, a copilot indicator is correlated with the copilot location on the aircraft. Flight attendant indicators may be correlated with different locations at different stages of the flight. For example, a forward flight attendant position may be correlated with the forward flight attendant chair during the take-off segment of a flight, then with the forward aisle during service segment of the flight, etc. Similarly, an aft flight attendant position may be correlated with the aft flight attendant chair during the take-off segment of a flight, then with the aft aisle during a service segment of the flight, etc. Mission profile data 116 may comprise flight data for various segments of a flight mission. The various modules and the data stores 110, 112, 114, 116 will be discussed in greater detail below.

Figure 2:
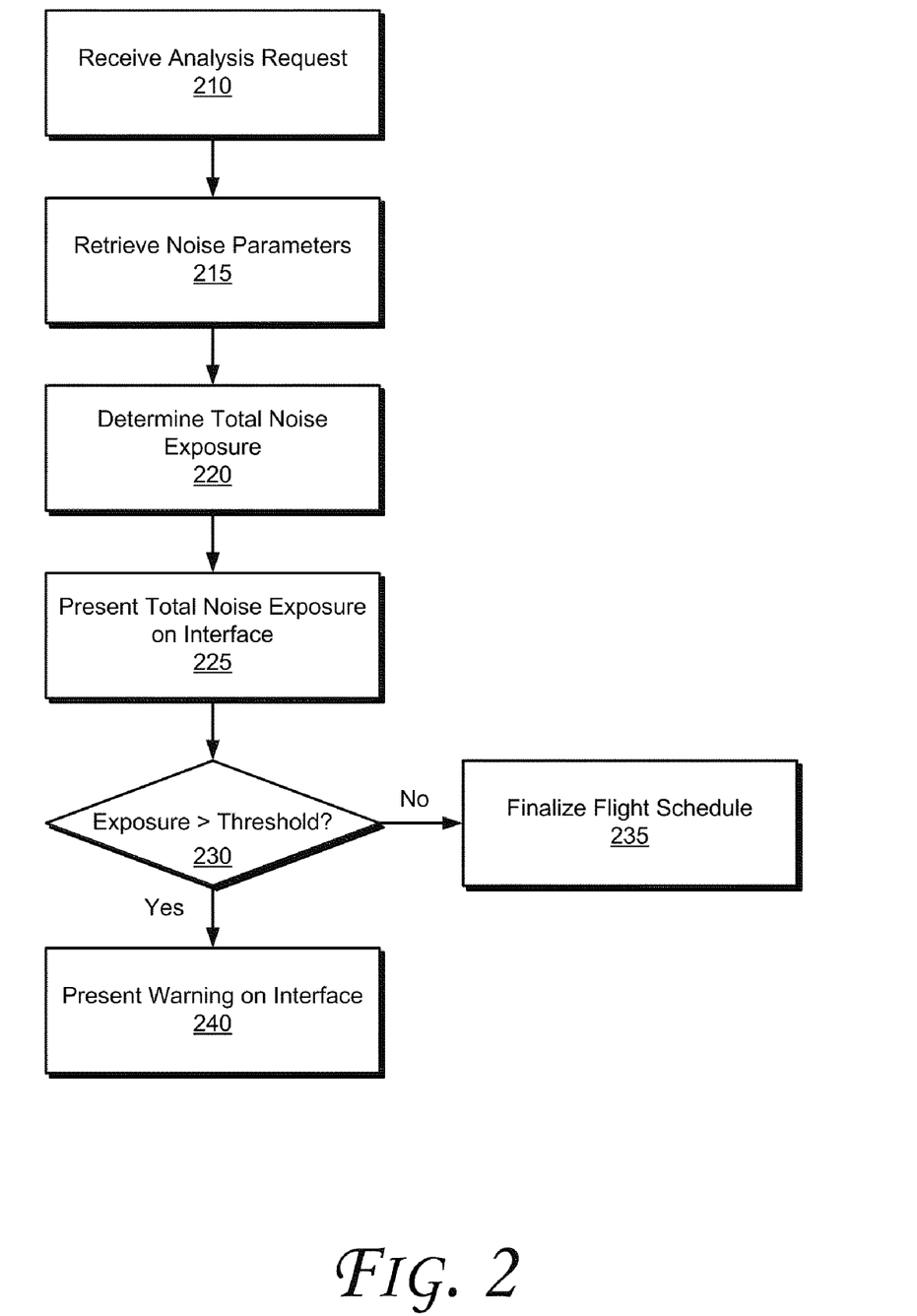
FIG. 2 is a flowchart illustrating high-level operations of a system for aircraft noise exposure analysis according to embodiments.
Figure 7:
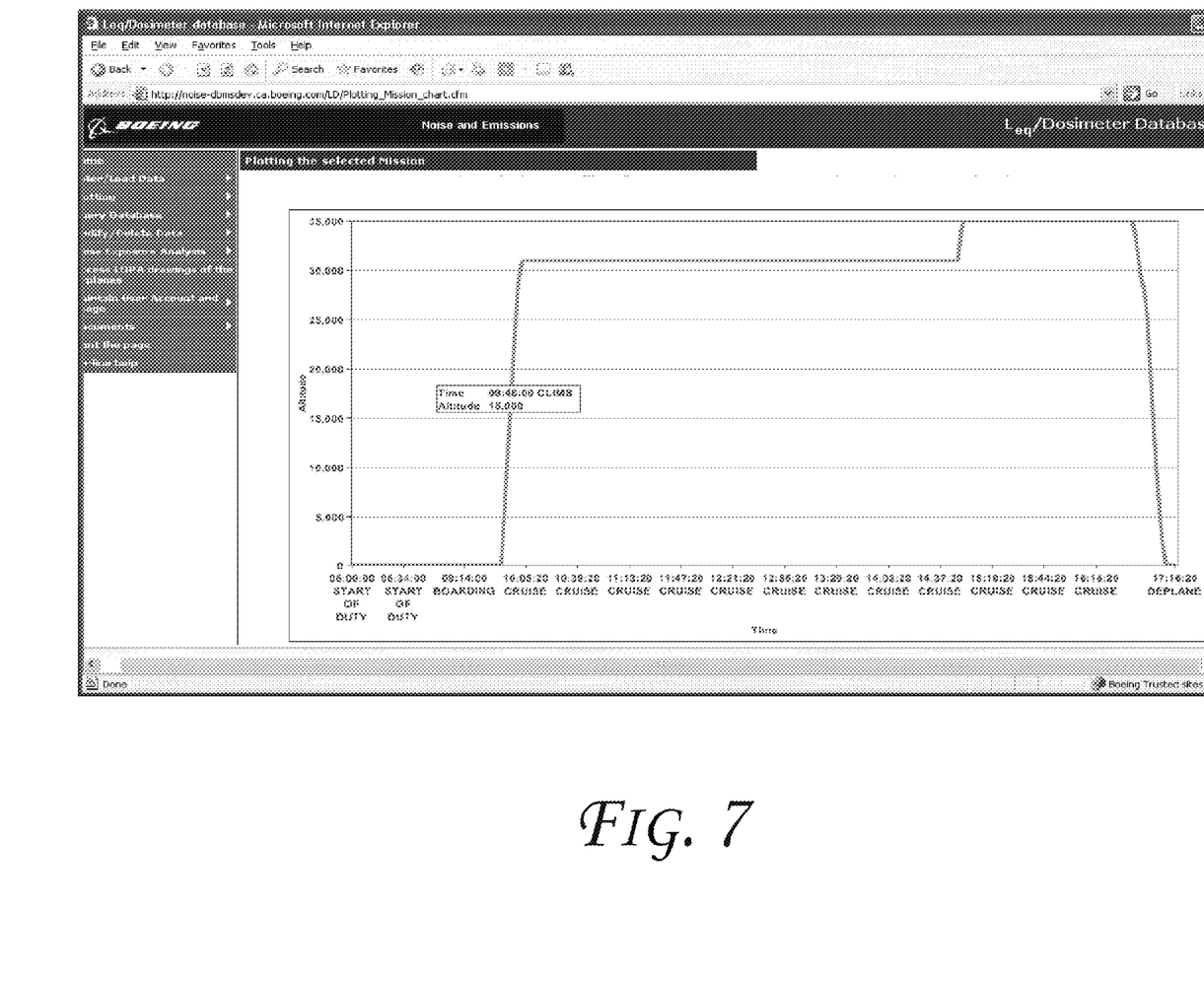
Figure 8:
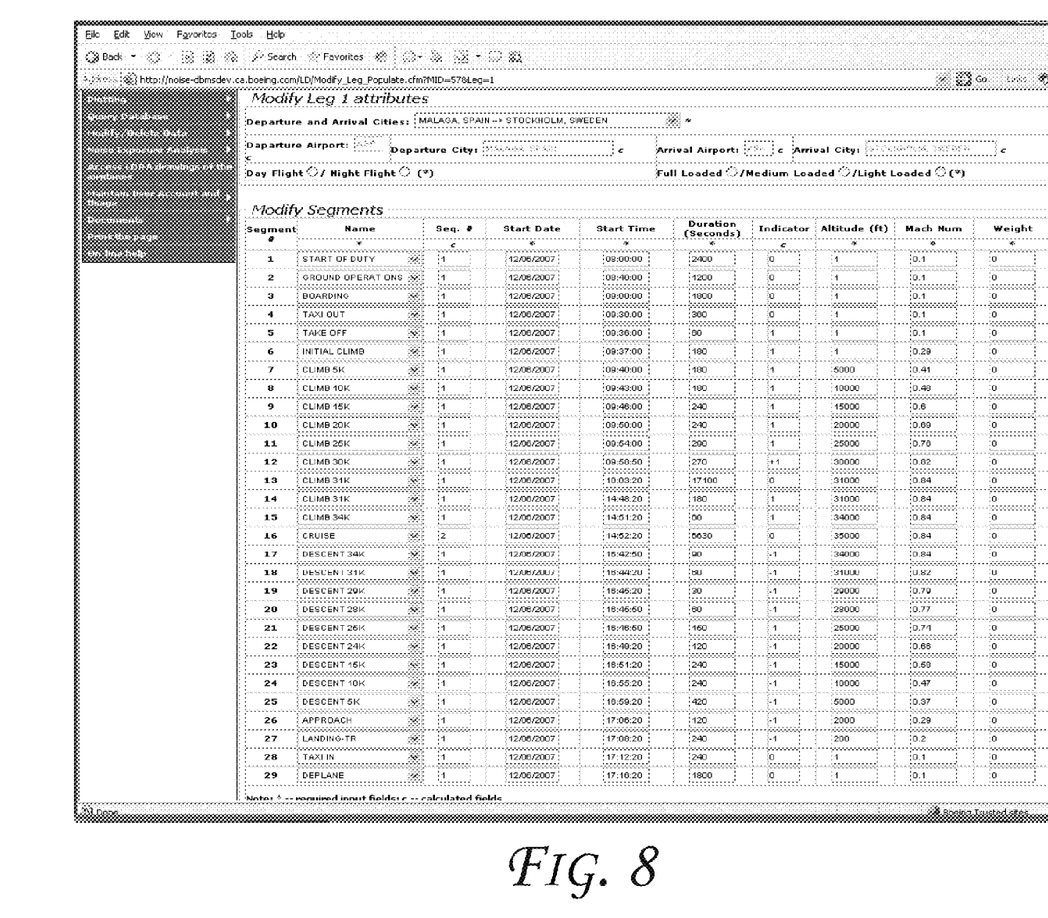

FIG. 2 is a flowchart illustrating high-level operations of a system for aircraft noise exposure analysis according to embodiments. Referring to FIG. 2, at operation 210 the system 100 receives a request for an analysis of noise exposure during a flight. In some embodiments the request may be received via a user interface 140. FIGS. 6-8 are screen shots of an exemplary user interfaces for accessing the system 100. Referring first to FIG. 6, the user interface enables a user to input flight mission attributes into the flight mission profile data store 116. For example, the flight mission attributes may include an airline code, an airplane model number, an engine type, an engine power unit, etc. Once a flight mission has been entered into the mission profile 116, subsequent users of the system 100 may retrieve the mission profile and use or modify it in accordance with their specific needs.

A second user interface (FIG. 8) enables a user to input various data regarding various segments of a flight leg, e.g., an operational parameter for each segment of the flight leg, a date and time for each segment of the flight leg, a duration for each segment of the flight leg, and an altitude and airspeed indicator for each segment of the flight leg. Again, once a flight leg has been entered into the data store 116, subsequent users of the system 100 may retrieve the mission profile and use or modify the various segment attributes according to their needs. A third user interface (FIG. 7) permits a user to see a visual depiction of the mission profile.

Figure 9:
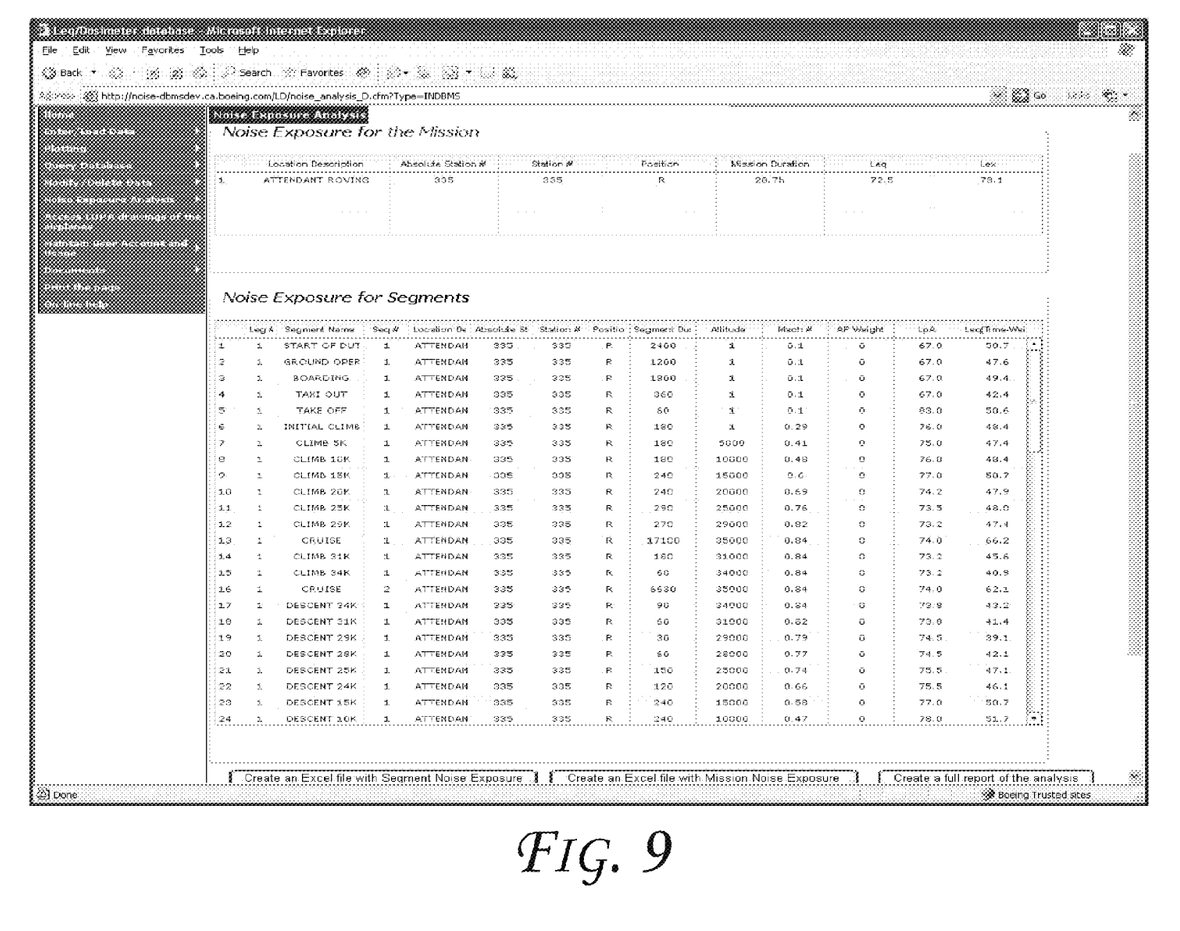

Referring back to FIG. 2, at operation 215 noise parameters corresponding to the data input for the various segments of the legs on the flight mission are retrieved. In some embodiments the noise parameters may be retrieved from the test data 110. Referring briefly to FIG. 9, the noise exposure (LpA) for each segment of the flight leg may be retrieved from the test data 110 and presented on the user interface 140. In addition, a time weighted noise exposure parameter (Leq) may be associated with each segment of the leg. A user interface (FIG. 10) permits a user to see a visual depiction of noise exposure for a selected crew position on the selected flight mission.

Figure 10:
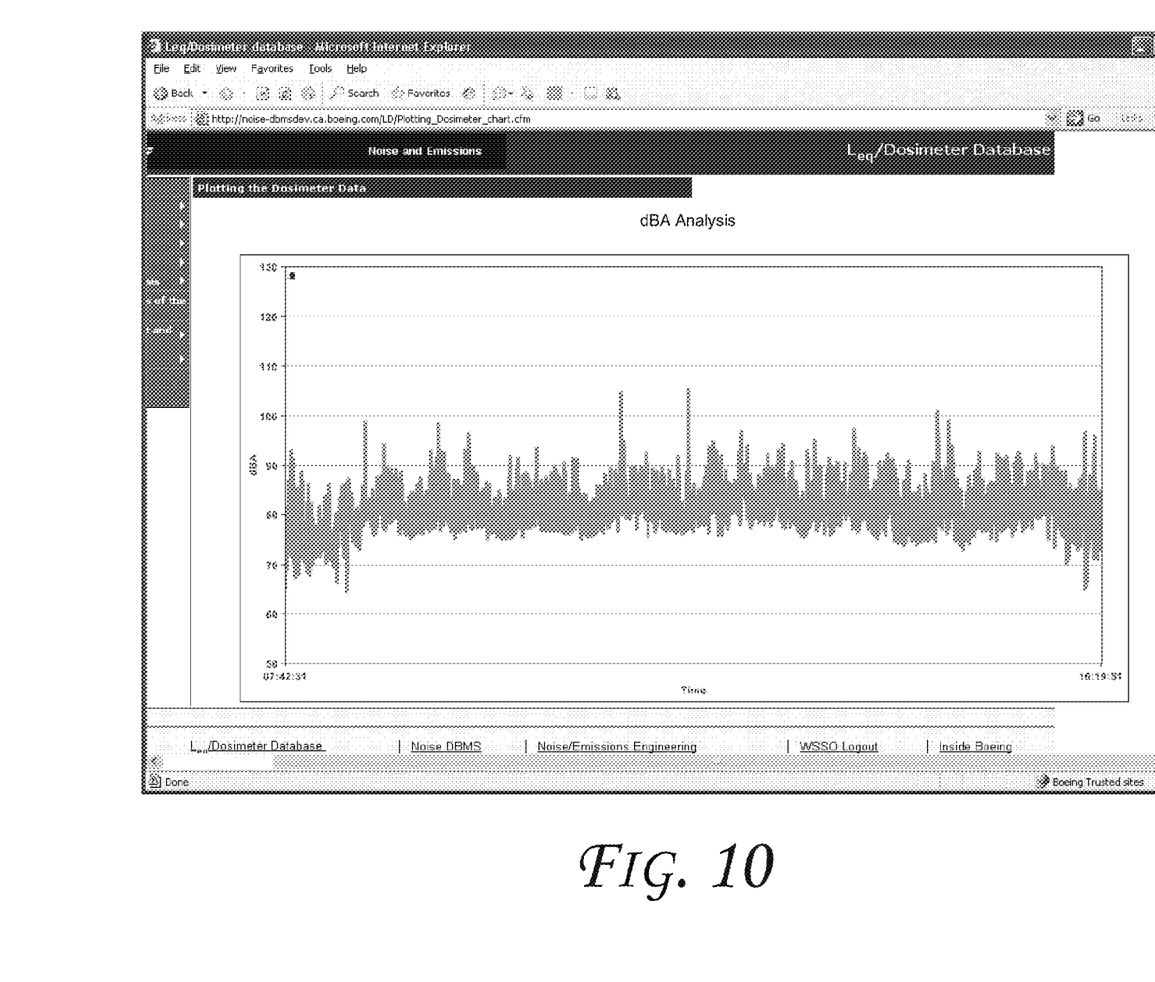
Figure 11:
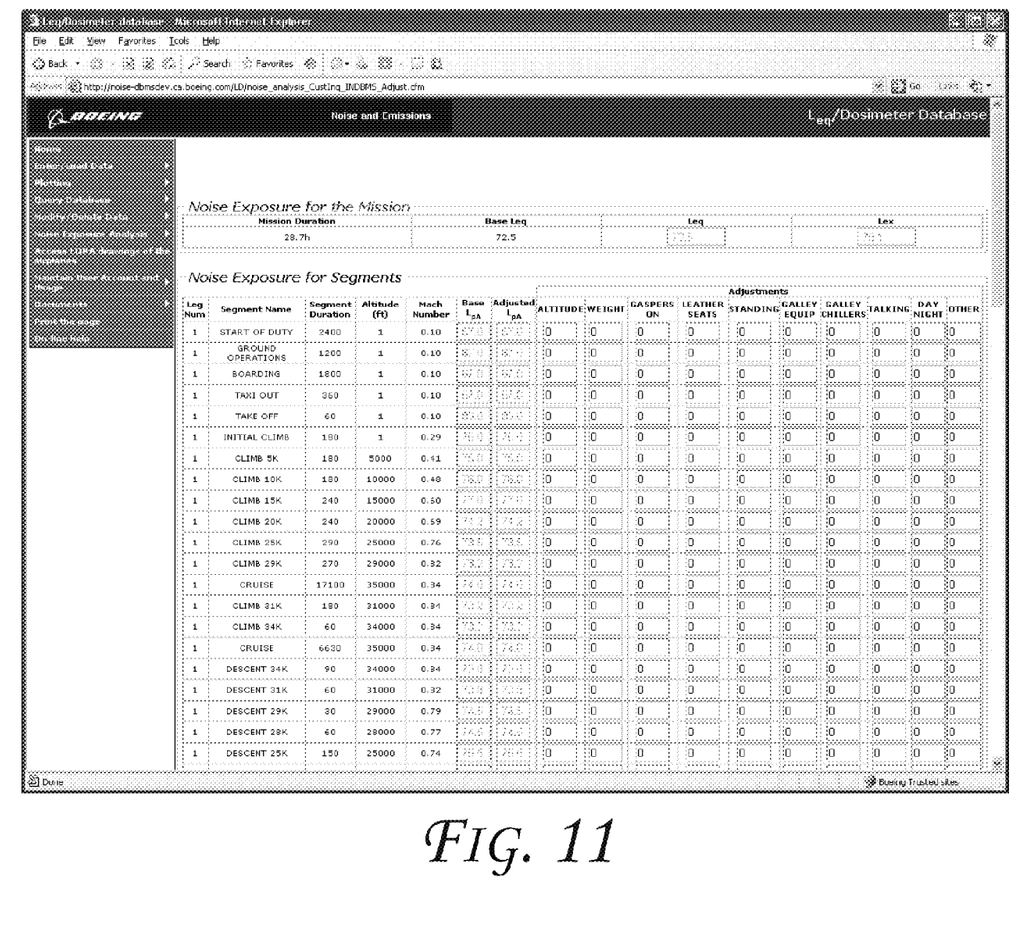

At operation 220 a total noise exposure parameter is determined for the flight leg and/or the entire flight mission. In one embodiment, the total noise exposure may be computed as a time-weighted average noise exposure summed over the various flight segments for each leg of the flight mission. At operation 225 the total noise exposure is presented on the user interface. Referring briefly to FIG. 10, noise exposure parameters for the mission (Leq and Lex) are presented on the user interface. Leq refers to the total noise exposure for a crew member regardless how many hours the crew worked. For example, the crew may work a ten hour mission or a five hour mission. Leq refers to the total noise exposure for the mission. By contrast, Lex refers to an eight hour normalized noise exposure to standardize the exposure measure.

If, at operation 230 the total noise exposure does not exceed a threshold, then control passes to operation 235 and the flight schedule may be finalized. For example, in some embodiments finalizing the flight schedule may comprise saving the flight schedule in a computer readable memory. When the current flight schedule is finalized, another flight schedule may be retrieved and processed. By contrast, if at operation 230 the total noise exposure meets or exceeds a threshold, then control passes to operation 240 and a warning may be presented on the user interface. In response to the warning, the user may decide to restart a scheduling process, or to change one or more assignments on one or more segments or legs of the flight mission. For example, a crew member may be relocated from a forward to an aft position, or vise-versa, to change the level of noise to which the crew member is exposed. The various noise exposure parameters may then be recalculated and tested against the threshold again. This process may continue until a suitable schedule is determined for the flight crew.

Figure 3:
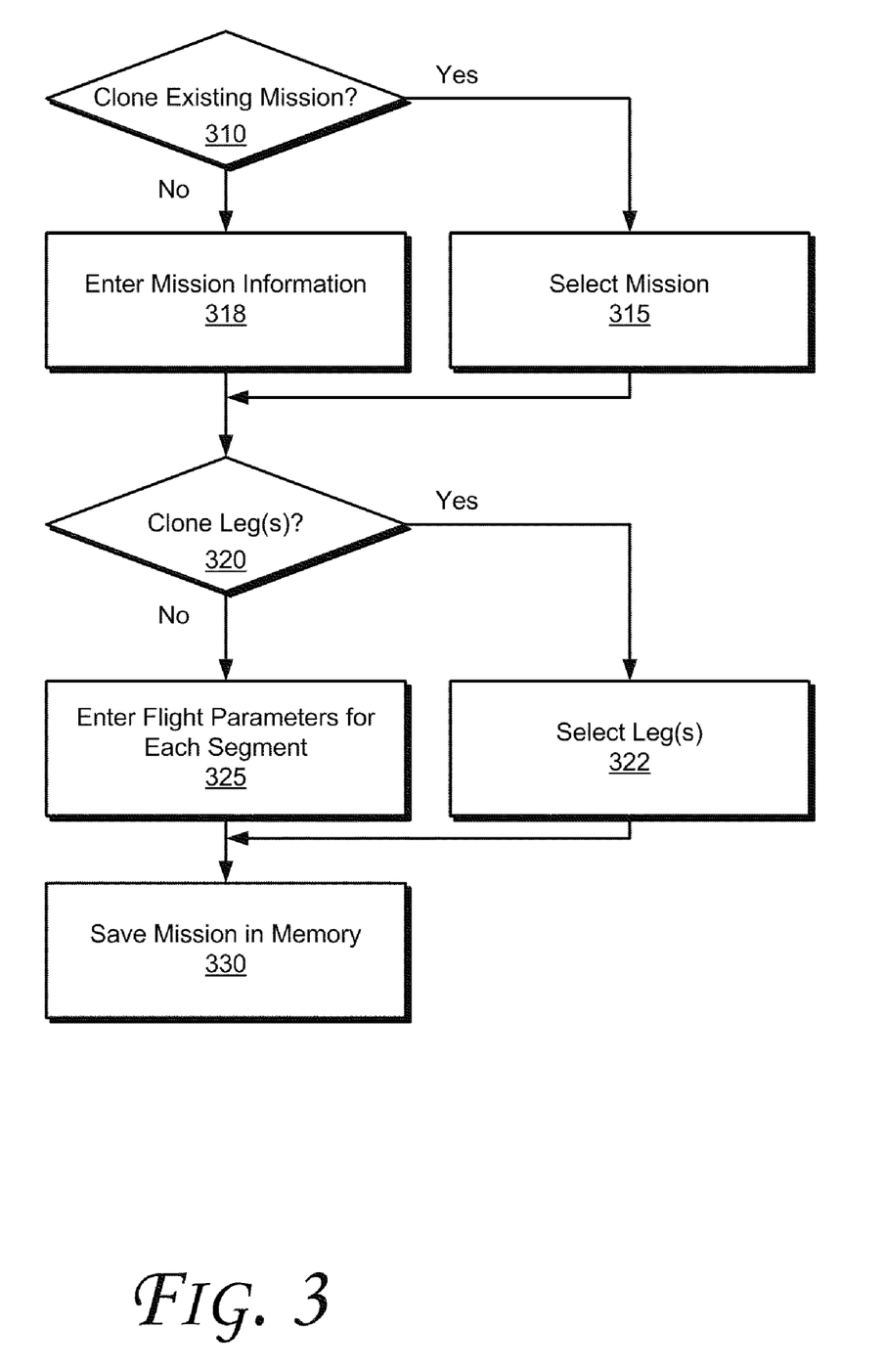
FIG. 3 is a flowchart illustrating operations for creating a mission in a system for aircraft noise exposure analysis according to embodiments.

FIG. 3 is a flowchart illustrating operations for creating a mission in a system for aircraft noise exposure analysis according to embodiments. In some embodiments, a user of the system 100 may generate one or more mission profiles which are stored in mission profile data 116. As described above, a flight mission may either be created from raw data or an existing flight mission may be retrieved from memory and cloned or revised. Thus, if at operation 310 an existing mission is to be cloned, a mission may be selected (operation 315) from the mission profile data 116 using the user interface 140. By contrast, if at operation 310 an existing mission is not to be cloned, then control passes to operation 318 and a user of the system enters the mission information from raw data (see, e.g., FIG. 8).

If, at operation 320, the mission legs are to be cloned then one or more legs are selected (operation 322) from the mission profile data 116 using the user interface 140. By contrast, if, at operation 320, the mission legs are not to be cloned, then control passes to operation 325 and the user may enter the flight parameters for each segment in the user interface (see, e.g., FIG. 8).

Once the mission information for each leg is complete, either by cloning the mission, the legs, or by entering data into the system, control passes to operation 330 and the mission profile is saved in memory, e.g., in mission profile data 116.

Figure 4:
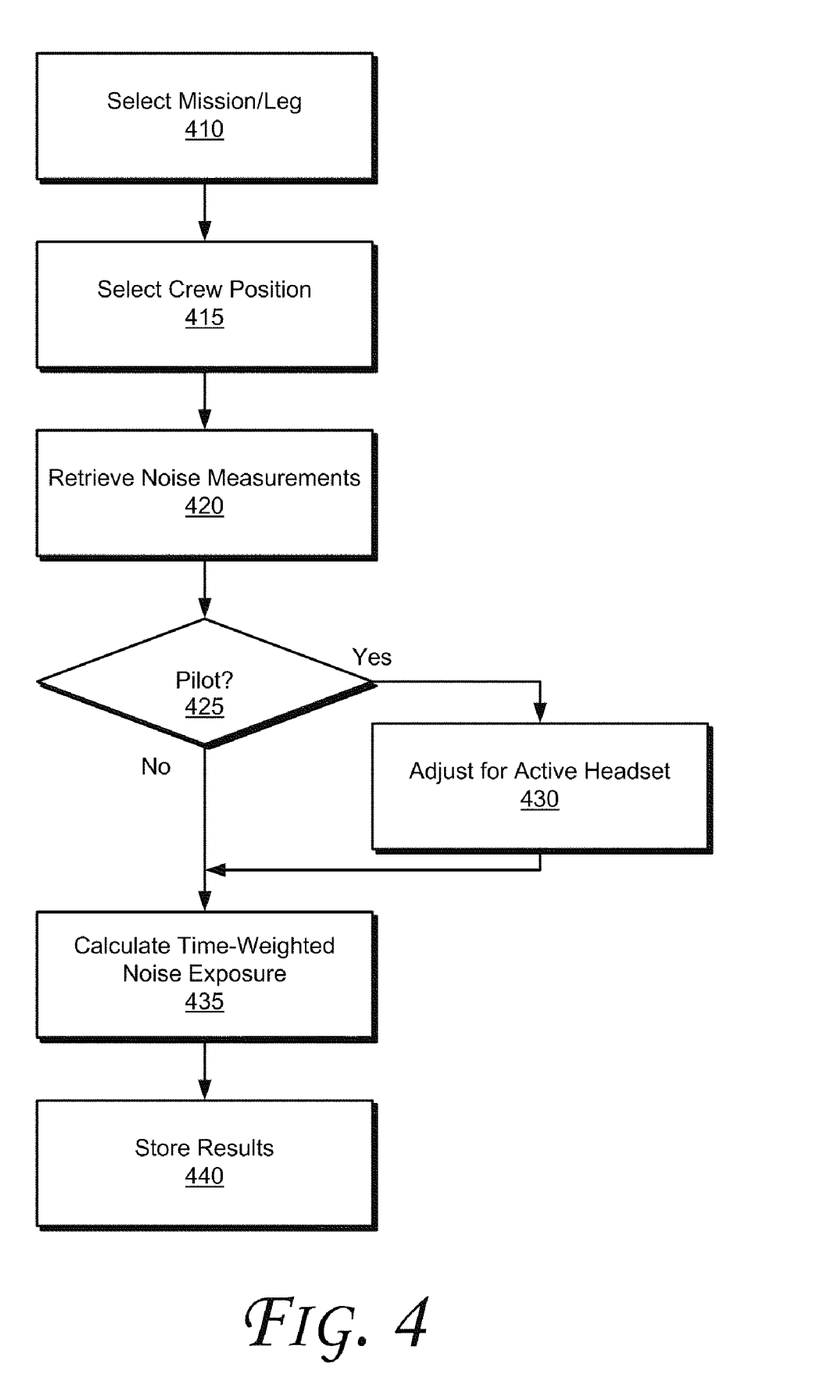
FIG. 4 is a flowchart illustrating operations for evaluating noise exposure during a mission in a system for aircraft noise exposure analysis according to embodiments.

In practice, the operations of FIG. 3 may be used to "stock" the system with flight missions. Once the system has an inventory of flight missions, a scheduler may use the data in the system to generate noise exposure parameters for various flight crew positions in an aircraft. FIG. 4 is a flowchart illustrating operations for evaluating noise exposure during a mission in a system for aircraft noise exposure analysis according to embodiments. Referring to FIG. 4, at operation 410 a mission and a specific leg is selected and at operation 415 a crew position on the mission leg is selected. If desired, one or more of the attributes of the various segments of the leg may be revised in the user interface (see, e.g., FIG. 8).

At operation 420 the noise exposure (LpA) for each segment of the flight leg may be retrieved from the test data 110 or Dosimeter data 112. If, at operation 425, the flight crew position in question is a pilot position, then control passes to operation 430 and the noise exposure parameters may be adjusted for an active headset worn by the pilot.

At operation 435 the time-weighted noise exposure parameters are calculated. Techniques for calculating noise exposure parameters vary based upon the particular circumstance of the noise exposure. For an in-service flight test, a mission with a total duration of time T has m segments. The $i^{th}$ segment has the duration $T_i$, and there are $n_i$ dosimeter readings during the period of $T_i$, where i is from 1 to m. In this situation, the noise exposure may be calculated as:

$$L_{eq-T_i} = 10 * \log\left\{\frac{\sum_{j=1}^{n_i} 10^{(dBA_j/10)}}{n_i}\right\} \quad (1)$$

Where $n_i$ is the number of observations during the period of $T_i$ for the ith segment. Then Leq of the ith segment is:

$$L_{Aeq-T_i} = 10 * \log\left\{\frac{T_i}{T} * 10^{(L_{eq-T_i}/10)}\right\} \quad (2)$$

For a complete mission, the nose exposure parameters $L_{eq}$ and $L_{ex}$ are given by:

$$L_{Aeq-T} = 10 * \log\left\{\frac{1}{T} * \sum_{i=1}^{m} T_i * 10^{(L_{eq-T_i}/10)}\right\} \quad (3)$$

$$L_{ex} = L_{Aeq-T} + 10 * \log\left(\frac{T}{T_8}\right) \quad (4)$$

Where $T_8$ represents an 8 hours work day (28800 seconds). If the crew flies the same mission n days a week (in 5 working day week or 40 hours working week), then the weekly average of daily noise exposure is given by:

$$L_{ex\_week} = 10 * \log\left\{\frac{1}{5} * \sum_{i=1}^{n} 10^{(L_{ex}/10)}\right\} \quad (5)$$

For an airline customer inquiry, assume there are K independent samples of tests. A customer has a mission profile with a total duration $T^c$, and the ith segment has the duration $T^c_i$. Then for the $i^{th}$ segment, $$L_{eq-T^c_i} = 10 * \log\left\{\frac{1}{K} * \sum_{j=1}^{K} 10^{(L_{eq-T_j}/10)}\right\} \quad (6)$$

$$= \bar{L} + 0.115 * s^2 \quad (7)$$

Where $$\bar{L} = \frac{1}{K} * \sum_{j=1}^{K} L_{eq-T_j}$$

is the arithmetic mean, and $L_{eq-T_j}$ is from sample j of the same segment, and $$s = \sqrt{\frac{\sum_{j=1}^{K}(L_{eq-T_j} - \bar{L})^2}{(K-1)}}$$

is the standard deviation.
Then Leq of the segment is:

$$L_{Aeq-T^c_i} = 10 * \log\left\{\frac{T^c_i}{T^c} * 10^{(L_{eq-T^c_i}/10)}\right\} \quad (8)$$

The mission's $L_{eq}$ and $L_{ex}$ are:

$$L_{Aeq-T^c} = 10 * \log\left\{\frac{1}{T^c} * \sum_{i=1}^{K} T^c_i * 10^{(L_{eq-T^c_i}/10)}\right\} \quad (9)$$

$$L_{ex} = L_{Aeq-T^c} + 10 * \log\left(\frac{T^c}{T_8}\right) \quad (10)$$

Where $T_8$ represents an 8 hour work day (28800 seconds). If the crew flies the same mission n days a week (in 5 working day week or 40 hours working week), then the weekly average of daily noise exposure is:

$$L_{ex\_week} = 10 * \log\left\{\frac{1}{5} * \sum_{i=1}^{n} 10^{(L_{ex}/10)}\right\} \quad (11)$$

In some situations a user would like to predict noise exposure for a flight crew position that moves around the cabin. For altitudes below a threshold (e.g., 15,000 feet) (both climb, descent, and ground), the user may select data (either fixed or roving) from locations/legs/missions of in-service flight tests. At above 15K, the user may use fixed locations' data at N groups with percentage $p_i$ at each group, where $$i = 1, 2, 3, \ldots, N \text{ and } \sum_{i=1}^{N} p_i = 100\%.$$

At each group i, the user may select data from $m_i$ locations/legs/missions. Then for the $i^{th}$ segment of the customer's mission, which is above 15K feet, $$L_j = 10 * \log\left\{\frac{1}{m_j} * \sum_{l=1}^{m_j} 10^{(L_{eq}-T_l/10)}\right\} \quad (12)$$

where Leq-$T_l$ is from sample l of the same segment at $j^{th}$ group $$L_{eq-T_i^c} = 10 * \log\left\{\sum_{j=1}^{N} p_j * 10^{(L_j/10)}\right\} \quad (13)$$

Equation (13) may be applied to equation (8) and to (9) to get noise exposure of the segment or the mission.

In some embodiments, noise exposure parameters for pilots may need to be adjusted to compensate for the pilot's headset. For in-service measurements, the air traffic communication equipment has two outputs: one to the dosimeter data, and the other to the pilot's headset. There is a conversion from what is recorded in the dosimeter, and the conversion formula is:

$$y = \alpha * x + \beta \quad (14)$$

Where $\alpha$, $\beta$ are estimated parameters, and x is the ATC dosimeter readings. The normal values of $\alpha$ a are between 1 and 1.03, and the normal values of $\beta$ are between –30 and –40. In addition, if the pilot is listening to ATC communication between Tatcs$_i$ and Tatce$_i$, where i is 1 to k, and Tates$_1 \geq$ mission start time and Tatcs$_k \leq$ mission end time. Furthermore, the pilot may wear an active headset to reduce noise exposure, and the active headset has a factor $-\delta$, where $\delta > 0$. The mission has m segments and each segment has start time Tss$_i$ and end time Tse$_i$, where i is 1 to m.

With an active headset, for the $i^{th}$ segment, $T_j$ represents the time for dBA$_{ATC}$, which is the Dosimeter reading for the ATC, then:

$$Tss_i \leq Tatcs_k \leq T_j \leq Tatce_k \leq Tse_i \quad (15)$$
$$y_j = \alpha * dBA_{ATC_j} + \beta$$
$$L_j = 10 * \log\{10^{((dBA_j - \delta)/10)} + 10^{(y_j/10)}\}$$

Where $dBA_j$ is the pilot's Dosimeter reading, and $\quad (16)$ $$L_{eq-T_i} = 10 * \log\left\{\frac{\sum_{j=1}^{n_i}(10^{(L_j/10)})}{n_i}\right\}$$

Equation (16) may then be applied to equations (2) to (3) to get the noise exposure of the segment and the mission.

By contrast, without an active headset, for the $i^{th}$ segment, $T_j$ represents the time for dBA$_{ATC}$, which is the Dosimeter reading for the ATC. Then:

$$Tss_i \leq Tatcs_k \leq T_j \leq Tatce_k \leq Tse_i$$

$$y_j = \alpha * dBA_{ATC_j} + \beta$$

$$L_j = 10 * \log\{10^{(dBA_j/10)} + 10^{(y_j/10)}\} \quad (17)$$

Where $dBA_j$ is the pilot's Dosimeter reading, and $$L_{eq-T_i} = 10 * \log\left\{\frac{\sum_{j=1}^{n_i}(10^{(L_j/10)})}{n_i}\right\} \quad (18)$$

Equation (18) may then be applied to equations (2) to (3) to get the noise exposure of the segment and the mission.

At operation 440 the time-weighted noise exposure data generated in operation 435 is stored in a computer readable medium, e.g., in the dosimeter data 112.

Figure 5:
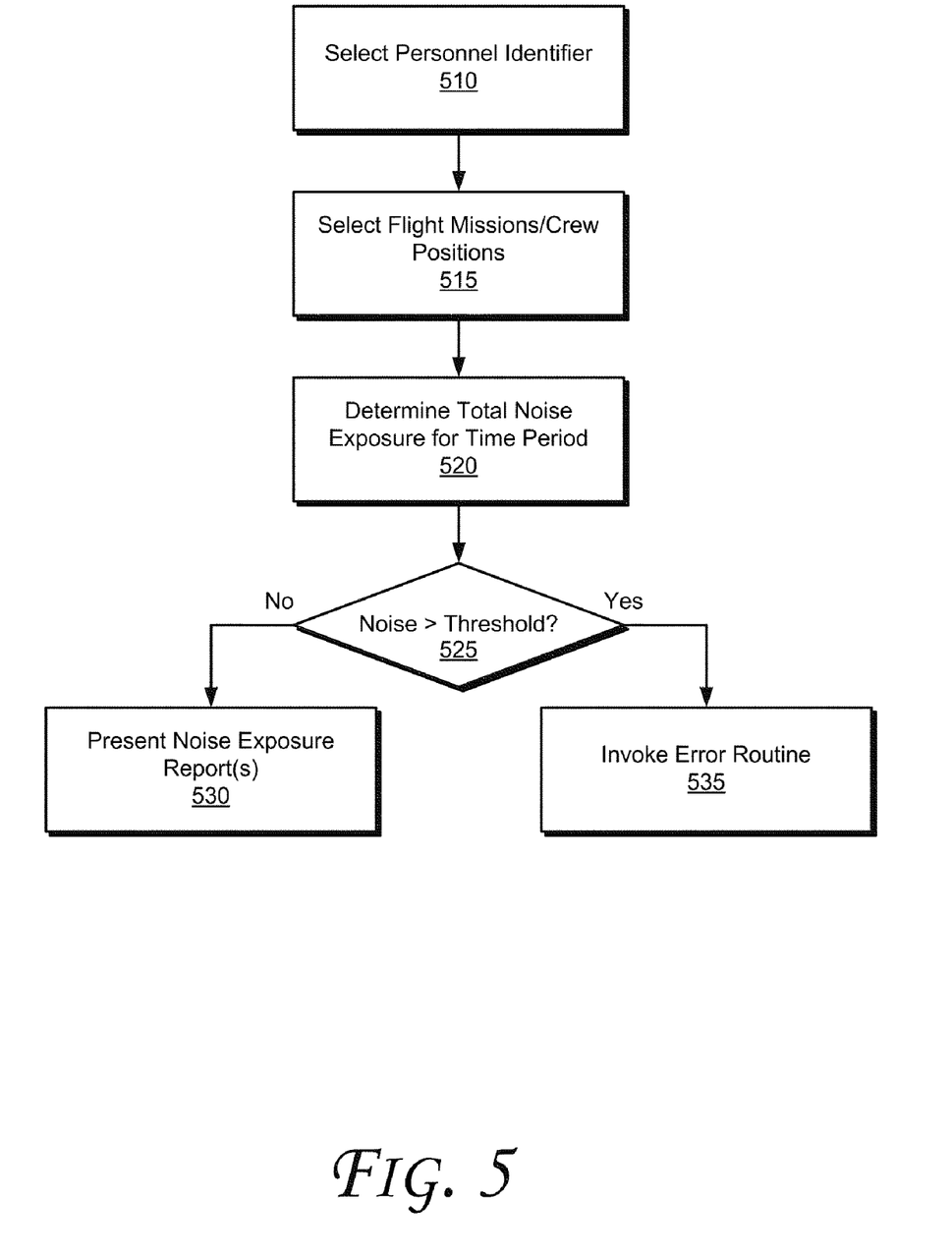
FIG. 5 is a flowchart illustrating operations for evaluating noise exposure for specific personnel during one or more missions in a system for aircraft noise exposure analysis according to embodiments.

The system 100 may be used in scheduling operations for pilots and other flight crew members. During scheduling operations, the system 100 may be used to determine whether a particular employee's work schedule subjects the employee to noise levels which exceed a threshold. FIG. 5 is a flowchart illustrating operations for evaluating noise exposure for specific personnel during one or more missions in a system for aircraft noise exposure analysis according to embodiments. Referring to FIG. 5, at operation 510 a personnel identifier associated with a particular employee (e.g., pilot or flight crew) is selected from a computer readable memory. At operation 515 one or more flight missions and crew positions for the flight missions are selected for the personnel identifier. At operation 520, the total noise exposure for the personnel identifier is calculated as described with reference to operation 435.

If, at operation 525 the total noise exposure for the personnel identifier exceeds a noise exposure threshold, then control passes to operation 535 and an error routine is invoked. In some embodiments the error routine may comprise presenting a noise exposure and reschedule notice on a suitable user interface such that a human interacting with the system can reschedule the personnel identifier on one or more different flights and/or a different crew position in order to reduce the noise exposure for the personnel identifier. In other embodiments the system 100 may be invoked by a computer based personnel scheduling system. In such embodiment, the error routine may comprise transmitting a reschedule notice to the computer based personnel scheduling system. In response, the computer based personnel scheduling system may reschedule the personnel identifier on one or more different flights and/or a different crew position in order to reduce the noise exposure for the personnel identifier. By contrast, if at operation 525 the noise exposure does not exceed a threshold, then control passes to operation 530 and one or more noise exposure reports for the personnel identifier. The flight missions/crew positions may be approved.

Figure 12:
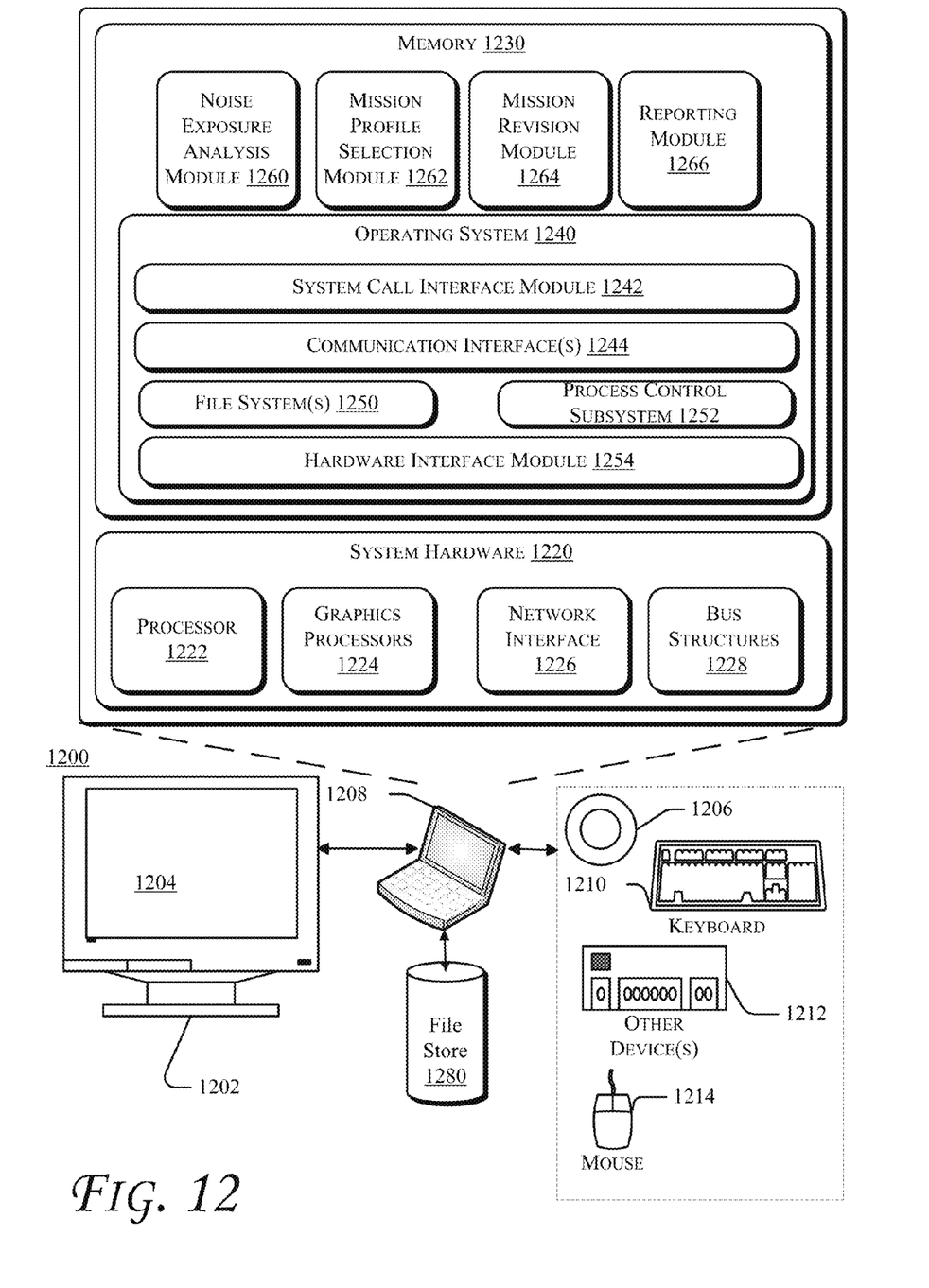
FIG. 12 is a schematic illustration of a computing device which may be adapted to implement a system for aircraft noise exposure analysis in accordance with some embodiments.

FIG. 12 is a schematic illustration of a computing device which may be adapted to implement a system for aircraft noise exposure analysis in accordance with some embodiments. In one embodiment, system 1200 includes a computing device 1208 and one or more accompanying input/output devices including a display 1202 having a screen 1204, one or more speakers 1206, a keyboard 1210, one or more other I/O device(s) 1212, and a mouse 1214. The other I/O device(s) 1212 may include a touch screen, a voice-activated input device, a track ball, and any other device that allows the system 1200 to receive input from a user.

The computing device 1208 includes system hardware 1220 and memory 1230, which may be implemented as random access memory and/or read-only memory. A file store 1280 may be communicatively coupled to computing device 1208. File store 1280 may be internal to computing device 108 such as, e.g., one or more hard drives, CD-ROM drives, DVD-ROM drives, or other types of storage devices. File store 180 may also be external to computer 1208 such as, e.g., one or more external hard drives, network attached storage, or a separate storage network.

System hardware 1220 may include one or more processors 1222, a two graphics processor(s) 1224, network interfaces 1226, and bus structures 1228 As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 1224 may function as adjunct processors that manages graphics and/or video operations. Graphics processor(s) 1224 may be integrated onto the motherboard of computing system 1200 or may be coupled via an expansion slot on the motherboard.

In one embodiment, network interface 1226 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 1228 connect various components of system hardware 1228. In one embodiment, bus structures 1228 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 1230 may include an operating system 1240 for managing operations of computing device 1208. In one embodiment, operating system 1240 includes a hardware interface module 1254 that provides an interface to system hardware 1220. In addition, operating system 1240 may include a file system 1250 that manages files used in the operation of computing device 1208 and a process control subsystem 1252 that manages processes executing on computing device 1208.

Operating system 1240 may include (or manage) one or more communication interfaces that may operate in conjunction with system hardware 1220 to transceive data packets and/or data streams from a remote source. Operating system 1240 may further include a system call interface module 142 that provides an interface between the operating system 1240 and one or more application modules resident in memory 130. Operating system 1240 may be embodied as a Windows® brand operating system or as a UNIX operating system or any derivative thereof (e.g., Linux, Solaris, etc.), or other operating systems.

In various embodiments, the computing device 1208 may be embodied as a personal computer, a laptop computer, or another computing device.

In one embodiment, memory 1230 includes a graphics processor selection module 162 to switching between graphics processors in computing system 100. In one embodiment, a noise exposure analysis module 1260, a mission profile selection module 1262, a mission revision module 1264, and a reporting module 1266. These modules may correspond to the analogous modules depicted in FIG. 1. The respective modules 1260, 1262, 1264, 1266 may include logic instructions encoded in a computer-readable medium which, when executed by processor 1222, cause the processor 1222 to evaluate aircraft cabin nose by performing the operations depicted in FIGS. 2-5 and using one or more of the user interfaces depicted in FIGS. 6-11.

Thus, described herein is a computer based system and method to implement aircraft cabin noise exposure analysis. In brief, the system comprises one or more data stores which may be loaded with noise measurements taken in different locations and under different operating conditions in the aircraft. Users can interact with the system via one or more user interfaces to develop parameters for different segments of legs of a flight mission. The data input via the user interface is received by the analysis module, which uses the data to determine noise exposure levels. The noise exposure levels may be compared to one or more thresholds, and a warning may be presented if the noise levels exceed the threshold(s). The parameters for different segments of legs of a flight mission may be adjusted, and noise exposure may be recalculated with the adjusted parameters. The recalculated noise exposure levels may be compared to thresholds again. The noise exposure analysis parameters may be stored in a computer readable medium and/or printed to a report. The system may present a warning if the noise exposure analysis indicates that a pilot or member of a flight crew may be exposed to excessive noise.

In the foregoing discussion, specific implementations of exemplary processes have been described, however, it should be understood that in alternate implementations, certain acts need not be performed in the order described above. In alternate embodiments, some acts may be modified, performed in a different order, or may be omitted entirely, depending on the circumstances. Moreover, in various alternate implementations, the acts described may be implemented by a computer, controller, processor, programmable device, firmware, or any other suitable device, and may be based on instructions stored on one or more computer-readable media or otherwise stored or programmed into such devices (e.g. including transmitting computer-readable instructions in real time to such devices). In the context of software, the acts described above may represent computer instructions that, when executed by one or more processors, perform the recited operations. In the event that computer-readable media are used, the computer-readable media can be any available media that can be accessed by a device to implement the instructions stored thereon.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A computer based method to evaluate aircraft cabin noise, comprising:

receiving, in a processor, a first request for an aircraft cabin noise analysis, wherein the request comprises a plurality of flight parameters associated with a first flight mission;

retrieving, from a computer readable memory coupled to the processor, a plurality of noise parameters associated with the plurality of flight parameters for the first flight mission;

determining, in the processor, a total noise exposure parameter associated with the first flight mission;

generating, in the processor, an output comprising the total noise exposure on a user interface; and generating a warning on a user interface coupled to the processor when the total noise exposure exceeds a threshold;

associating, in the processor, the flight mission parameters and total noise exposure parameter with a unique personnel identifier; and storing the flight mission parameters, the total noise exposure parameter and the unique personnel identifier in a computer readable memory coupled to the processor.

2. The method of claim 1, wherein receiving the first request for an aircraft cabin noise analysis comprises receiving a request at least one of:
a crew member indicator;
a plurality of flight segments;
a flight parameter associated with each of the plurality of flight segments;
a time parameter associated with each of the plurality of flight segments; and
a speed parameter associated with each of the plurality of flight segments.

3. The method of claim 1, wherein retrieving, from a computer readable memory, a plurality of noise parameters associated with the plurality of flight parameters for the flight mission comprises retrieving noise exposure levels corresponding to the flight parameters.

4. The method of claim 1, wherein determining a total noise exposure parameter associated with the flight mission comprises determining a time-weighted average noise exposure parameter for the flight mission.

5. The method of claim 1, wherein determining a total noise exposure parameter associated with the flight mission comprises applying an adjustment factor to at least one of the plurality of noise parameters.

6. The method of claim 1, further comprising:
receiving a second request for an aircraft cabin noise analysis, wherein the second request comprises a plurality of flight parameters associated with a second flight mission and is associated with the unique personnel identifier;
retrieving, from a computer readable memory, a plurality of noise parameters associated with the plurality of flight parameters for the second flight mission;
determining a total noise exposure parameter associated with the second flight mission; and
generating an output comprising the total noise exposure from the first flight mission and the second flight mission on a user interface; and
generating a warning on a user interface when the total noise exposure from the first flight mission and the second flight mission exceeds a threshold.

7. A computer based system to evaluate aircraft cabin noise, comprising:
a processor; and
a computer readable memory module comprising logic instructions which, when executed by the processor, configure the processor to:

receive a first request for an aircraft cabin noise analysis, wherein the request comprises a plurality of flight parameters associated with a first flight mission;
retrieve, from a computer readable memory, a plurality of noise parameters associated with the plurality of flight parameters for the first flight mission;
determine a total noise exposure parameter associated with the first flight mission;
generate an output comprising the total noise exposure on a user interface; and
generate a warning on a user interface when the total noise exposure exceeds a threshold;
associate the flight mission parameters and total noise exposure parameter with a unique personnel identifier; and
store the flight mission parameters, the total noise exposure parameter and the unique personnel identifier in a computer readable memory.

8. The computer based system of claim 7, wherein the first request for an aircraft cabin noise analysis comprises at least one of:
a crew member indicator;
a plurality of flight segments;
a flight parameter associated with each of the plurality of flight segments;
a time parameter associated with each of the plurality of flight segments; and
a speed parameter associated with each of the plurality of flight segments.

9. The computer based system of claim 7, further comprising logic instructions which, when executed, configure the processor to retrieve noise exposure levels corresponding to the flight parameters.

10. The computer based system of claim 7, further comprising logic instructions which, when executed, configure the processor to determine a time-weighted average noise exposure parameter for the flight mission.

11. The computer based system of claim 7, further comprising logic instructions which, when executed, configure the processor to apply an adjustment factor to at least one of the plurality of noise parameters.

12. The computer based system of claim 7, further comprising logic instructions which, when executed, configure the processor to:
receive a second request for an aircraft cabin noise analysis, wherein the second request comprises a plurality of flight parameters associated with a second flight mission and is associated with the unique personnel identifier;
retrieve, from a computer readable memory, a plurality of noise parameters associated with the plurality of flight parameters for the second flight mission;
determine a total noise exposure parameter associated with the second flight mission; and
generate an output comprising the total noise exposure from the first flight mission and the second flight mission on a user interface; and
generating a warning on a user interface when the total noise exposure from the first flight mission and the second flight mission exceeds a threshold.

13. A computer program product comprising logic instructions stored on a nontransitory computer readable medium which, when executed, configure a processor to evaluate aircraft cabin noise by performing operations, comprising:
receiving a first request for an aircraft cabin noise analysis, wherein the request comprises a plurality of flight parameters associated with a first flight mission;

retrieving, from a computer readable memory, a plurality of noise parameters associated with the plurality of flight parameters for the first flight mission;

determining a total noise exposure parameter associated with the first flight mission;

generating an output comprising the total noise exposure on a user interface; and generating a warning on a user interface when the total noise exposure exceeds a threshold;

associating the flight mission parameters and total noise exposure parameter with a unique personnel identifier; and storing the flight mission parameters, the total noise exposure parameter and the unique personnel identifier in a computer readable memory.

14. The computer program product of claim 13, wherein receiving the first request for an aircraft cabin noise analysis comprises receiving a request at least one of:
   a crew member indicator;
   a plurality of flight segments;
   a flight parameter associated with each of the plurality of flight segments;
   a time parameter associated with each of the plurality of flight segments; and
   a speed parameter associated with each of the plurality of flight segments.

15. The computer program product of claim 13, wherein retrieving, from a computer readable memory, a plurality of noise parameters associated with the plurality of flight parameters for the flight mission comprises retrieving noise exposure levels corresponding to the flight parameters.

16. The computer program product of claim 13, wherein determining a total noise exposure parameter associated with the flight mission comprises determining a time-weighted average noise exposure parameter for the flight mission.

17. The computer program product of claim 13, wherein determining a total noise exposure parameter associated with the flight mission comprises applying an adjustment factor to at least one of the plurality of noise parameters.

18. The computer program product of claim 13, further comprising:
   receiving a second request for an aircraft cabin noise analysis, wherein the second request comprises a plurality of flight parameters associated with a second flight mission and is associated with the unique personnel identifier;
   retrieving, from a computer readable memory, a plurality of noise parameters associated with the plurality of flight parameters for the second flight mission;
   determining a total noise exposure parameter associated with the second flight mission; and
   generating an output comprising the total noise exposure from the first flight mission and the second flight mission on a user interface; and
   generating a warning on a user interface when the total noise exposure from the first flight mission and the second flight mission exceeds a threshold.

* * * * *